Aug. 26, 1969  W. A. CLAY  3,463,581
SYSTEM FOR THREE-DIMENSIONAL PANORAMIC, STATIC-IMAGE MOTION PICTURES
Filed Jan. 17, 1966  2 Sheets-Sheet 1

INVENTOR.
WALLACE A. CLAY
BY
HIS ATTORNEY

Aug. 26, 1969 W. A. CLAY 3,463,581
SYSTEM FOR THREE-DIMENSIONAL PANORAMIC, STATIC-IMAGE
MOTION PICTURES
Filed Jan. 17, 1966 2 Sheets-Sheet 2

INVENTOR.
WALLACE A. CLAY
BY M. Ralph Shaffer
HIS ATTORNEY

United States Patent Office 3,463,581
Patented Aug. 26, 1969

1

3,463,581
SYSTEM FOR THREE-DIMENSIONAL PANORAMIC
STATIC-IMAGE MOTION PICTURES
Wallace A. Clay, Ogden, Utah, assignor to Intermountain Research and Engineering Company, Inc., Salt Lake City, Utah, a corporation of Utah
Filed Jan. 17, 1966, Ser. No. 521,065
Int. Cl. G03b 25/00, 35/18
U.S. Cl. 352—100                                     7 Claims

ABSTRACT OF THE DISCLOSURE

The present invention comprises a method and apparatus for producing static-image, stereoscopic displays in which visually apparent movement of subject matter therein simulates and corresponds with movement in the original panorama photographed. This is accomplished through structural and method-step correlation between distance (preferably equivalent to interocular spacing) and time spacing of successive image recordings in the photographing of the panorama and the speed of relative movement between the viewing screen incorporating stepped reproductions of said recordings and the viewer of said viewing screen.

---

The present invention relates to stereoscopic pictoral displays of panoramic scenes, as produced through the use of anamorphic lenses, and, more particularly, to a new and improved system and structure for visually producing three-dimensional, static-image motion-picture displays.

In the present invention advantage is taken of using anamorphic lenses and compressed stereoscopically-related scene sector images disposed in registry behind such lenses, to produce respective stereoscopic panoramic scenes to respective eyes of an observer, and, additionally, relies upon relative motion between the observer and the picture screen being used so that any motion, if existing at the time of camera exposures, will now be presented to an observer. Accordingly, what is accomplished is a motion picture production in three-dimensional photography, by relying solely upon the relative motion between the panoramic "picture" being used and the observer.

Accordingly, a principal object of the present invention is to provide a motion picture effect in a stereoscopic reproduction for one or more observers.

A further object is to provide a system for producing from a series of static images a motion picture display, which is also a stereoscopic display.

An additional object is to provide a means of reproducing, in motion, any movement relative to stationary background, this in a pictorial display accommodating one or a group of observers.

An additional object is to provide a unique method of producing a motion-picture effect in reproduced stereoscopic panoramas which also includes a stereoscopic effect.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a view of a pictorial display designed in accordance with the present invention which relies upon the movement of an observer to produce the desired motion-picture effect.

2

Figure 1:
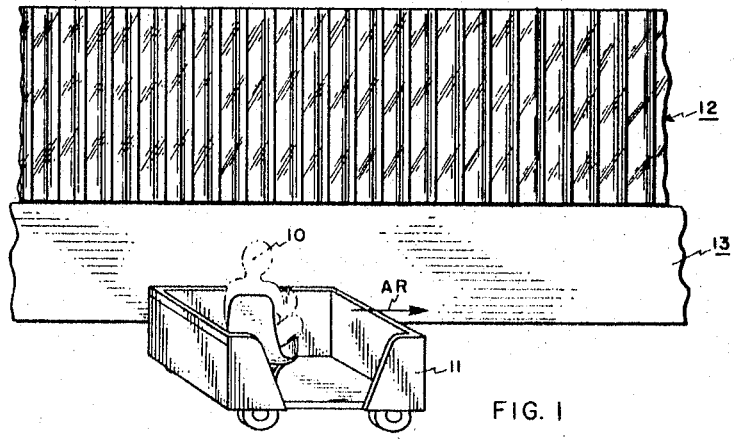

In FIGURE 1 an individual 10 is shown to be riding in a vehicle 11 past a display 12 mounted upon supporting base 13. In this embodiment of the invention the individual is moving past a stationary panoramic display. The person 10 might also be walking in the direction illustrated by arrow AR.

Figure 2:
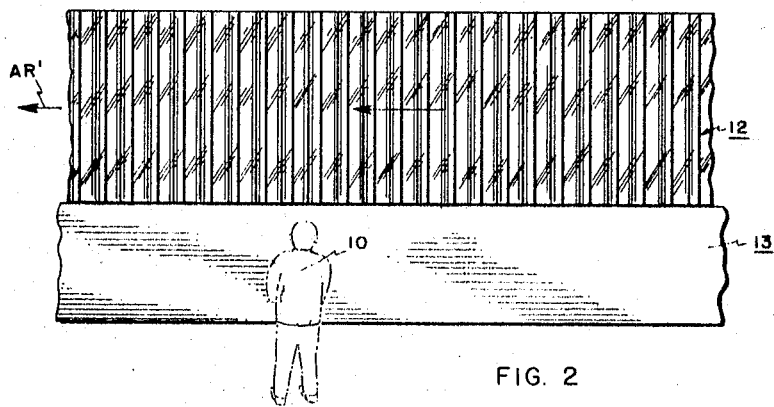
FIGURE 2 is a view of structure similar to that shown in FIGURE 1 but wherein the display itself moves to accommodate stationary observers.

In the embodiment of the invention shown in FIGURE 2 the person 10 is standing still in front of display 12 which moves in a direction shown by arrow AR′. Thus, that is, in either situation shown in FIGURES 1 and 2, there is a relative horizontal motion between the viewer 10 and the display 12.

Figures 3, 4:
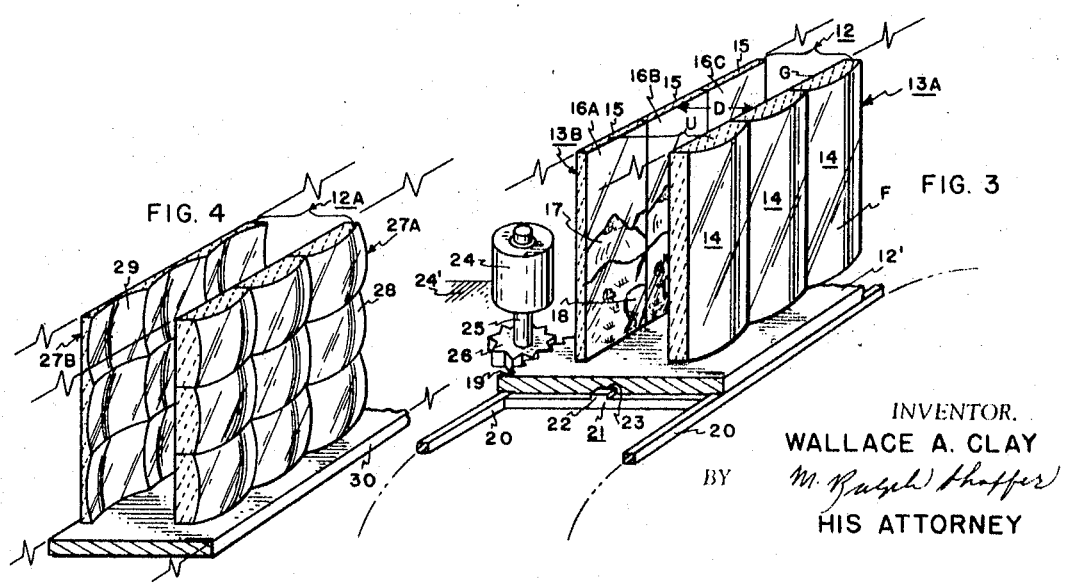
FIGURE 3 is a fragmentary perspective of certain elemental, anamorphic lens and screen structure utilized to provide the desired effect in the present invention.
FIGURE 4 is a view similar to FIGURE 3 but illustrates a group of aspherical lenses in connection with elemental concave sector images for producing an effect similar in principle to that utilized in FIGURE 3.

FIGURE 3 illustrates a simplified form of construction of the display 12 in FIGURE 2. In FIGURE 3 the display 12, which may be considered as the viewing screen of the invention, includes a lenticulated picture face 13A which, in FIGURE 3, comprises a series of juxtaposed elemental lenses 14 each having a substantially cylindrically- or elliptically-ground exterior surface F and an interior planar surface G. The lenses 14 in FIGURE 3 are plano-convex and, as known in the art, are horizontally expanding, anamorphic lenses. This is to say, they expand the horizontal dimension of a horizontally-compressed scene sector while leaving the vertical dimension substantially undistorted. Rather than using elongate, plano-convex cylindrical lenses, there might reasonably be employed another type of horizontally-expanding lenses such as meniscus lenses, concave-convex lenses, double-convex lenses, and so forth. For sake of convenience, all lenses suitable to the present invention will be referred to simply as anamorphic lenses. Considering FIGURE 4 for a moment, it will be seen that planospherical lenses 28, and objective support 27B for scene sectors 29, may also be used where there is desired a type of expansion as is shown in the U.S. patent issued to Ossoinak, Patent No. 2,833,176. Sector images on supports 29 are disposed behind the lenses in respective registry.

Figure 6:
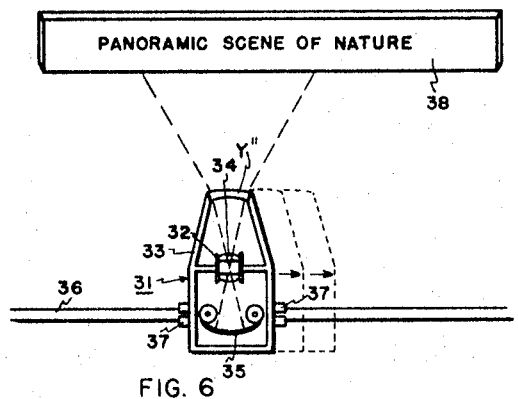
FIGURE 6 is a view of certain camera structure when the same is used to photograph a panoramic scene from successive, mutually-spaced, camera vantage points.

Disposed behind said lenses 14 at a distance D which is less than the focal length of the equivalent lenses is a series of horizontally-compressed sector images 16A, 16B, 16C, and so forth, which will be explained hereinafter. These sector images are mounted upon respective upstanding supports 15, disposed in registry with the respective cylindrical lenses 14. It will be noted that in each of these sector images there appears a certain background 17 and a certain foreground 18, by way of illustration. The sector images may comprise positive prints or transparencies spaced side-to-side in juxtaposed relationship. These sector images may be taken as a single camera is moved progressively sideways from one exposure position to another exposure position along a line of predetermined exposure points which are mutually spaced a slight distance with respect to each other. See FIGURE 6. The spacing between adjacent exposure points may be equal to the interocular distance of an average observer's eyes. This will be explained more fully hereinafter.

As to the physical details, where the screen is moving relative to the observer in the condition shown in FIGURE 2, the display or viewing screen may be mounted upon a base 12' which in turn slides, by a roller means or otherwise, along plural tracks 20. The tracks are mutually held together by ties 21 which in turn are provided with upstanding guides 22. Guide slot 23 is disposed in the base 12', the latter which holds the upstanding lenses 14 and supports 15 in a vertical position. A motor 24, fixed in disposition by means 24', includes an output shaft 25 upon which spur gear 26 is keyed. This spur gear may be caused to mesh the rack-like teeth 19 of base 12', this in order to enable the motor to drive the display in a straight or circular pattern, for example, along the tracks 20. Obviously, there are many means that may be employed to drive the display or viewing screen in a direction AR' in FIGURE 2 so that a stationary observer will enjoy the appearance of the picture as hereinafter explained. Of course, the display or viewing screen may be stationary where the observer is riding or walking, as seen in FIGURE 1, past the display, to enjoy its visual effects.

Figure 5:
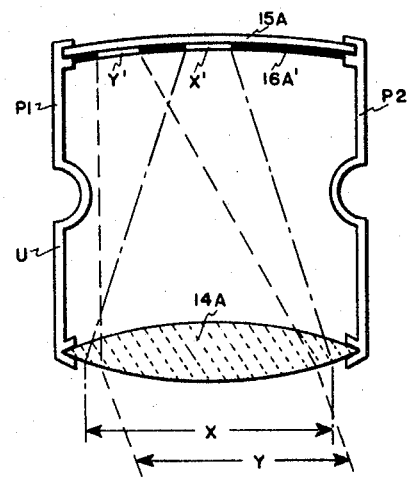
FIGURE 5 is a view, looking down, of a respective cell in representative viewing structure in the invention.

FIGURE 5 illustrates the basic concept of the invention. The space between lens 14A and image means 16A' need not be an air space but may be of any transparent material such as an optical plastic. In this regard the inventor's U.S. Patent No. 3,187,339, entitled "Three Dimensional Viewing Apparatus," is incorporated herein fully by way of reference. In referring now to FIGURE 5 it is seen that a representative cylindrical lens element 14A, this time shown as double-convex, is mounted within a holder comprising partitions P1 and P2 which are fixedly disposed with respect to each other. Disposed rearwardly, with respect to the observer, of the representative lens 14A is an image screen 15A upon which a horizontally-compressed respective image means such as a print 16A' is mounted. Thus, and as explained in the foregoing patent by the inventor, for any given position of an observer there may be seen from one particular vantage point an elemental vertical segment X' of the print 16A'. This vertical strip "fills" the lens 14A when viewed by the observer so that no portion outside of the X' area of print 16A is seen by the viewer at this point. Were the observer at another point, then he might see the segment Y' which is subtended by the width of the lens 14A. This, of course, is a different portion of the print from X' as seen by the original observer point. Let us assume that 16A' comprises the print taken by a camera in FIGURE 6, i.e., camera 31, when it is in a position shown by the solid line configuration. A first exposure will be taken when the camera is so positioned in FIGURE 6, and subsequent exposures will be taken when the camera is incrementally displaced from left to right, for example. A preferment of the invention, for appropriate panoramic work, is that the exposure camera pattern be divergent, with the maximum radius of curvature of the divergent pattern being near infinity. In other words, in no case should the camera pattern be more than slightly convergent towards the scene being taken. A preferred mutual spacing between adjacent camera positions would be less than the interocular spacing of an individual.

Figure 8:
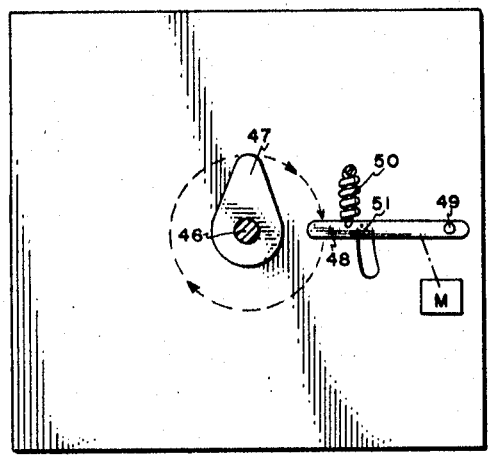
FIGURE 8 is an enlarged detail of representative structure by which the structure of FIGURE 7 may be employed to trip successively the shutter mechanism of the camera used.
Figure 7:
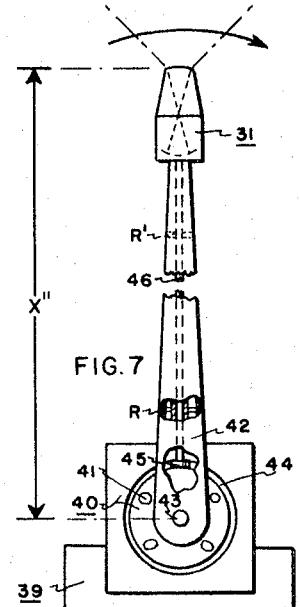
FIGURE 7 is a plan view of camera rotating structure which may be employed to take a series of successive camera exposures along a divergent exposure pattern relative to the panoramic scene being taken.

Another means of taking successive divergent pictures of the observed panoramic scene is to provide a mounting plate 40, which is mounted by means of mounting bolts 41 to an automobile or other vehicle 39. The mounting plate may include a ring 44 on which wheel 45 rolls. Extension arm 42 is pivoted to the mounting plate 40 by means of pivot bolt 43, and the arm 44 is provided with journalling means at R for journalling a revolving rod 46 which revolves about its own axis in accordance with the movement of arm 42. The length X'' of arm 42 plus the camera length to its negative window should be equal to the radius of the circular screen (as in FIGURE 9) for which this type of sector images of the circular panoramic is being recorded. Rod 46 turns a cam 47 which itself progresses in accordance with the direction of the arrow shown in FIGURE 8 to operate a shutter lever 48. Shutter lever 48 is pivoted at 49 and includes a return spring 50. The camera will be provided with a suitable stop 51. In operation then, the progressive movement of the arm 42, by virtue of the rotation of the same about the axis at pivot bolt 43, will produce a corresponding rapid revolvement of wheel 45 and hence of shaft or rod 46 to which the wheel is affixed. This in turn produces a movement of the cam 47 which serves to actuate shutter lever 48, to take successive exposures of shutter mechanism M in FIGURE 8, of conventional design. A similar arrangement including all the apparatus of FIGURE 8 may be set up along a nominally straight track as in FIGURE 6, instead of the circular track of FIGURE 7, to activate the sideways-moving camera of FIGURE 6; this camera may be double, oppositely facing cameras to record two panoramas instead of one. The shutter mechanisms of both of said cameras in this case will be activated by the single apparatus of FIGURE 8. The same apparatus of FIGURE 8 is ample to record both the relative movement of objects in successive sector images of the panoramic scene being recorded (either divergently or in parallel manner) and also the stereoscopic depth realized by all normally-seeing observers of the curved or straight viewing screens, if the time intervals between successive exposures made by said camera or cameras is properly calculated and the distances between the successive recording positions assumed by said camera or cameras is also properly calculated.

Figure 9:
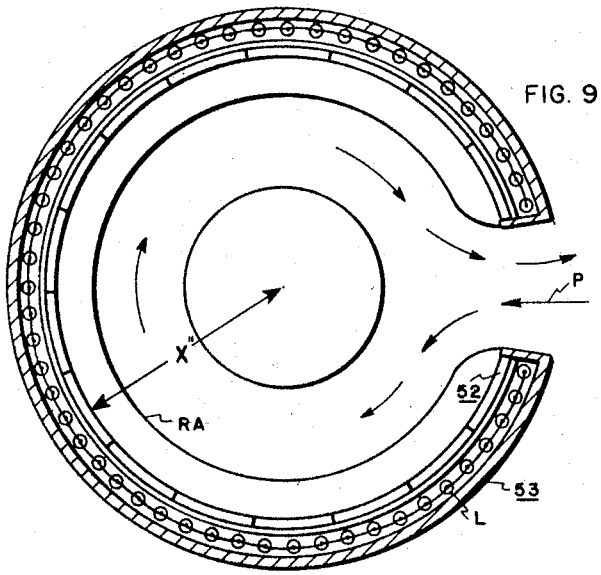
FIGURE 9 is a plan view of an indoor or outdoor plant used to display a large visual panorama of the present invention to a group of observers passing along a given path in front of the scene structure.

For convenience in over-all plant design, there may be provided a multiplicity of units U (see FIGURES 1 or 5) which are placed in groups of 20 or more, for example, and encased in such groups by cases 52, see FIGURE 9. The individual units 52, each containing a multiplicity of cells similar to that shown in FIGURES 1 or 5, for example, are spaced side-by-side so that a large visual display is presented to individuals traversing a path P as shown by the arrows in FIGURE 9. The cells may be themselves translucent so that a series of fluorescent lights L, for example, appropriately wired to an electrical current source, (not shown) may be disposed behind the sign to illuminate the individual sections of the display. In such a configurement the supports 15A will be translucent and the scene sector 16A comprise transparencies. A railing RA may be provided to keep the traffic pattern well within that area which is most conducive to natural enjoyment of the exhibit.

The taking of the sector images prints or transparencies, and the optical phenomena involved are fully set forth in the inventor's U.S. Patent, No. 3,187,339, above referenced, and are fully incorporated herein by way of reference. Accordingly, and in summation, the viewer will observe a continuous respective panorama by each of his respective eyes, which will give a stereoscopic effect, plus an effect of relative movement simultaneously. Thus, an observer standing at a particular point will see the elemental section X' of FIGURE 5 (filling one lens 14A) and a corresponding segment of a scene sector seen through the adjacent lens 14A. His right eye will hence see a continuous panorama of the entire scene, as explained in Patent No. 3,187,339, taken as the camera 31, having at Y'' a negative, horizontally compressive cylindrical lens window (see the inventor's U.S. patent, No. 3,225,672), moves from one particular point to successive, mutually-spaced points along a chosen camera pattern. A corresponding, stereoscopically-related, continuous panorama will likewise be seen by his remaining eye. Movement of the observer in the same direction in which the pictures were originally taken, will produce to the observer a proper movement of the foreground and of objects in the panoramic scene, were such subjects in a condition of movement while the exposures were being taken. For example, consider a dog or a horse that is moving in the foreground at the time the camera exposures were taken. An observer, walking through the display of FIGURE 9, would actually see the dog moving, relative to the stationary background, as the observer walks along the path the arrows indicate. Were the observer to stand still and the display to move, as in the condition shown in FIGURE 2, then the movement of the screen would have to be from right to left. Then, when the screen moves, animation of any moving objects anywhere in the panoramic stereoscopic scene results. Thus, what is provided in the present invention is a static means and method of simulating moving pictures stereoscopically by a moving or stationary display, this by relying upon the relative movement of the observer relative to the display in producing animation. Again, this may be accomplished either by the observer standing still and the screen moving, as shown in FIGURE 2, or by the observer walking or riding past a stationary display, as seen in FIGURE 1. Where the situation of FIGURE 1 exists, then no moving parts whatever need be employed in the display. Where there exists no relative movement at all between the viewing screen and observers, there would be no realization of movement by said observers in the said panoramic scene, but there would nevertheless be the realization of stereoscopic depth to each observer with normal binocular vision so that the exhibit would then be a static stereoscopic scene only.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A construction for displaying panoramic moving pictures stereoscopically to observers situated in front of the viewing screen of said construction, wherein there is a relative horizontal movement between said viewing screen and said observers, said construction including: a viewing screen comprising a plurality of juxtaposed, convergent, identical lenses disposed in a vertical plane and positioned horizontally consecutively, a plurality of juxtaposed, progressively oriented, compressed stereoscopically-related, photographically recorded sector images of a panoramic scene fixedly disposed behind said lenses in individual registry therewith, each of said sector images being stereoscopically related to the sector images on either side of it, said sector images being disposed from respective ones of said lenses with which they are in registry a lesser distance than the focal length of said lenses, said sector images with their respective lenses being progressively and horizontally evenly spaced in distance between photographic recording viewpoints and evenly spaced in time intervals between successive image recordings, to transmit to said observers, by said relative movement, an illusion of depth and an illusion of motion in said viewing screen; and means for enabling the production of relative motion between said observers and said viewing screen such that observer viewpoints relative to said viewing screen can be in correspondence with viewpoints of said sector images.

2. The combination of claim 1 wherein said lenses are narrow vertical cylindrical lenses and said sector images are horizontally compressed images arranged in corresponding pattern behind them.

3. The combination of claim 1 wherein said lenses are spherical lenses arranged as vertical groups in a horizontal band and said sector images are arranged in a corresponding pattern behind them.

4. The combination of claim 1 wherein said enabling means comprises means for translating said viewing screen past said observers in a direction reverse to the viewpoint progression of said sector images.

5. The combination of claim 1 wherein said enabling means comprises means for transporting said observers at a nominally even speed horizontally in front of said viewing screen, in a direction in correspondence with the progression of viewpoints of said sector images.

6. The combination of claim 1 wherein said image sectors are horizontally compressed, said lenses being anamorphic lenses to expand horizontally portions of said scene sectors as viewed through said lenses.

7. A method of displaying a panoramic moving-picture scene stereoscopically to an audience in front of a special viewing screen wherein there is a relative movement between said viewing screen and said audience, said method comprising: photographing in an equivalent time-spaced sequence a panoramic scene from a series of horizontally progressive, mutually-and-equally-spaced vantage points which are stereoscopically-related and in a manner such that the scene sectors so recorded comprise progressive stereoscopic doublets and are horizontally compressed exposures; producing from said exposures a progressive series of scene sector images each of which is stereoscopically related to the scene sector image disposed on either side of it; placing a progressive series of anamorphic lenses contiguously and in respective registry with and in front of said scene sector images and at a distance less than the focal length of said lenses, said anamorphic lenses expanding vertical elemental areas of said scene sector images as viewed therethrough in a horizontal direction, and said lenses and said scene sector images constituting said viewing screen; and providing for the production of uniform relative movement between said lenses, with their scene sector images, and the audience viewing the same such that movement of said audience with respect to said viewing screen is in correspondence with and in the same direction as the time-spaced and distance-spaced progression of viewpoints of said scene sector exposures.

References Cited

UNITED STATES PATENTS

| | | | |
|---|---|---|---|
| 2,063,985 | 12/1936 | Coffey. | |
| 2,622,472 | 12/1952 | Bonnet | 352—58 |
| 2,833,176 | 5/1958 | Ossoinak. | |
| 3,187,339 | 6/1965 | Clay | 352—61 |
| 3,225,651 | 12/1965 | Clay | 352—61 |

FOREIGN PATENTS 106,866   6/1917   Great Britain.

JULIA E. COINER, Primary Examiner

U.S. Cl. X.R.

352—43, 58, 61, 81